United States Patent [19]
Ulibarri et al.

[11] Patent Number: 6,149,724
[45] Date of Patent: *Nov. 21, 2000

[54] HYDRAULIC CEMENT WITH ACCELERATED HIGH STRENGTH DEVELOPMENT

[75] Inventors: Ramon Poo Ulibarri; Waltter Lopez Gonzalez, both of Monterrey; Jose Torres, San Nicolas de los Garza, all of Mexico

[73] Assignee: Cemex, S.A. de C.V., Mexico City, Mexico

[ * ] Notice: This patent issued on a continued prosecution application filed under 37 CFR 1.53(d), and is subject to the twenty year patent term provisions of 35 U.S.C. 154(a)(2).

[21] Appl. No.: 08/766,666

[22] Filed: Dec. 4, 1996

[30] Foreign Application Priority Data

Jun. 10, 1996 [MX] Mexico ................................ 962271

[51] Int. Cl.$^7$ .................................. C04B 07/32
[52] U.S. Cl. .......................... 106/693; 106/695; 106/715; 106/735; 106/736; 106/739
[58] Field of Search .................................. 106/692, 693, 106/695, 715, 735, 736, 739, 757, 768, 772

[56] References Cited

U.S. PATENT DOCUMENTS

| | | | |
|---|---|---|---|
| 3,147,129 | 9/1964 | Armstrong | 106/695 |
| 3,251,701 | 5/1966 | Klein | 106/89 |
| 3,857,714 | 12/1974 | Mehta | 106/735 |
| 3,860,433 | 1/1975 | Ost et al. | 106/89 |
| 4,002,484 | 1/1977 | Baudouin | 106/693 |
| 4,286,991 | 9/1981 | Galer et al. | 106/695 |
| 4,404,031 | 9/1983 | Sudoh et al. | 106/715 |
| 4,419,136 | 12/1983 | Rice | 106/695 |
| 4,957,556 | 9/1990 | Kunbargi | 106/722 |
| 5,356,472 | 10/1994 | Odler | 106/768 |

FOREIGN PATENT DOCUMENTS

| | | |
|---|---|---|
| 0271329 | 6/1988 | European Pat. Off. . |
| 2186442 | 1/1974 | France . |
| 13 02 478 | 8/1967 | Germany . |
| 42 27 815 | 2/1994 | Germany . |
| 1067858 | 5/1967 | United Kingdom . |
| WO 89 04815 | 6/1989 | WIPO . |

OTHER PUBLICATIONS

Chem. Abstracts vol. 105 No. 14, Oct. 6, 1986 Abstract No. 119076m.
T.A. Atakuziev et al. p. 302 XP002041126 (& SUR44 121 A) Jul. 15, 1986.
Chemical Abstracts vol. 109 No. 10 (Sep. 5, 1988) Abstract No. 78698X.
X Li et al. p. 340 XP000019927 {CN 103 649 A Dec. 9, 1987.
X. Li et al. p. 340. XP000019927 {CN 103 649 A (ID.) (Dec. 9, 1987)}.

Primary Examiner—Paul Marcantoni
Attorney, Agent, or Firm—A. Thomas S. Safford; Frommer Lawrence & Haug LLP

[57] ABSTRACT

A method of manufacturing cements based on calcium sulfoaluminate by forming a clinker through calcining a selection of typical cement precursor raw materials to temperatures of more than 1200° C. in an industrial kiln, preferably with a preheater (typically of the cascading cyclone type) and precalciner, selected in such a manner that the clinker thus produced has a high content of calcium sulfoaluminate, tricalcium silicate and dicalcium silicate with no other calcium aluminates and, preferably during or prior to the grinding thereof, adding to the clinker thus produced (with the above recited basic components), effective amounts of calcium oxide or hydroxide and calcium sulfate, in order to activate said clinker. Upon said grinding, a temperature of about 100 to 125° C. is to be attained for a time long enough to convert gypsum to the hemihydrate form, thus making sure that the calcium sulfate present in the thus obtained cement product is in a condition to react quickly during the hydration of said cement; thereby giving rise to the early formation of ettringite; for which the presence of a pH above 12 is needed. Also claimed is the novel activated cement resulting from the calcination and grinding methods of this invention.

11 Claims, No Drawings

HYDRAULIC CEMENT WITH ACCELERATED HIGH STRENGTH DEVELOPMENT

FIELD OF THE INVENTION

The invention forming the subject matter of this application relates to the production of high early strength cements which develop high-strength in a short time with reliable predictability; more particularly, the invention teaches a method of producing such cements and also relates to the cement itself.

BACKGROUND OF THE INVENTION

Hydraulic cements are known which are composed of materials formed by oxides and defined chemicals from the field of inorganic chemistry, the use of which is based on the chemical reaction of the oxides and other constituents of the cement with water in order to form hydrated compounds which aggolmerate to form a mass wherein more or less rapid mechanical strengths are developed. Within the general concept of "hydraulic cements" there are on the market cements of the above-mentioned type, some capable of very fast development of mechanical strength. These are broadly known as "aluminous cements".

Said aluminous cements are substantially composed of calcium aluminate of the formula $CaO.Al_2O_3$ and minor amounts of calcium aluminoferrite $4\,CaO.Al_2O_3.Fe_2O_3$, as well as traces of other calcium aluminates of the formula $12CaO.7Al_2O_3$.

The invention of this application is not related to such aluminous cements but rather to those cements based on the calcium sulfoaluminate compound of the formula $4CaO.3Al_2O_3.SO_3$.

The oldest reference to cements based on calcium sulfoaluminate was made in a French patent granted in 1936 to the firm Poliet et Chausson, Paris, France, which invention had its origin in the research of Henri Lossier. Those cements, based on calcium sulfoaluminate, have since then become known as Lossier cements.

By 1941 the above-mentioned French firm was manufacturing upon request "expansive and contractionless cements", produced from a clinker obtained through calcination of a mixture of suitable compositions, based on gypsum, clays and limestone.

By 1958, in the United States, Klein submitted a paper during the 61st Annual Meeting of the ASTM, wherein he stated that a compound, non-precisely identified (which seemed to correspond to an anhydrous calcium sulfoaluminate), was the cause of the behavior of these expansive cements. Since then practically, such expansive cements based on calcium sulfoaluminate are known as K cements by ASTM and follow specification No. C-845: Expansive hydraulic cements.

Expansive cements, such as those mentioned above, were manufactured in a more or less empiric way until the Fifth International Congress on the Cement Chemistry, held at Tokyo in 1968; where in the lectures of various authors there was agreement identifying the main component of such cements as being calcium sulfoaluminate (having the formula $4CaO.3Al_2O_3.SO_3$.

According to the prior art teachings to obtain such expansive cements, the clinker based on calcium sulfoaluminate was admixed with Portland clinker, as well as with granulated slag from blast furnaces, in order to obtain a "controlledexpansion" product. Since then, the cement researchers became aware that those cements based on calcium sulfoaluminate clinker exhibited earlier and greater strengths relative to those obtained with the use of Portland cement alone (as was clearly established, for instance, in U.S. Pat. No. 4,957,556 to Hassan Kunbargi).

Regarding the Kunbargi invention and according to the teachings derived therefrom, it is practically impossible to determine accurately the setting time of the cement by the Vicat method, as the setting time is very fast, thus making the manipulation of the concrete produced from such cement very difficult, even though the use of citric acid is recommended as a setting retardant.

Another problem of the cement produced according to the Kunbargi patent is that the development of the strength thereof is unpredictable and, although in certain instances the anticipated compressive strengths can be attained, frequently much lesser strengths are obtained. This problem is due basically to those materials forming the Kunbargi cement, as defined in the corresponding U.S. Patent.

Also regarding the Kunbargi patent, it is pointed out at columns 3 and 4 that the calcium sulfoaluminate is not thermodynamically stable, and when heated in an industrial kiln, decomposes at temperatures higher than 1200° C.

On the other hand, the Kunbargi patent clearly states at column 5 that, due to the thermodynamic properties of the calcium sulfoaluminate, it is highly difficult, if not impossible, to obtain clinker resulting from calcination of the raw materials to produce cement containing effective amounts of calcium sulfoaluminate, tricalcium silicate and dicalcium silicate. As a consequance of which, it is pointed out in said patent that clinker thus produced must be admixed with a separate hydraulic clinker containing tricalcium silicate and dicalcium silicate.

Finally, with respect to the Kunbargi patent, there are doubts about the fact that the compressive strengths mentioned therein are actual; particularly when it is assumed that through the use of the test methods identified as ASTM-C-109 or EN196-1 (the latter being the standard for the European Community), the required values for such strengths are not obtained. It is also not clear what would be the actual value for such strength, since in the context of the above-recited patent the strength of the cement produced according to the Kunbargi method is compared to the strength of Portland cement.

Furthermore, with respect to the problem of measuring the strength as developed by Kunbargi cement, it is not clear which is the method he used to determine the cement setting at different ages thereof; which leads one to believe that such measurements are equivalent to those made regarding Portland cements; and in any case he states that they are equivalent. This in fact is not true, since the value of the mechanical strength of any type of hydraulic cement is not an absolute value (such as might be said for the specific gravity or the chemical composition thereof). On the contrary, the values for such strength basically depend on the method employed to evaluate the same. Mechanical strength, in case of hydraulic cements, is a function of the water:cement ratio as well as of the cement:sand ratio. Thus, when any of said ratios are changed, the results in the measuring methods are not comparable.

According to the ASTM method, the cement:sand ratio is 1:2.75 and the water:cement ratio is about 0.49 for Portland cements. In Kunbargi's patent a cement:sand ratio of 1:1 is employed and, of course, the water:cement ratio that he used is not clear.

FEATURES OF THE INVENTION

Therefore, it is a feature of the invention to obtain a cement based on calcium sulfoaluminate, in the process of the manufacture of which the raw materials are calcinated into clinkers at temperatures above 1200° C., without lowering the content of calcium sulfoaluminate in said clinker, due to decomposition thereof.

It is another feature of the invention to obtain a cement based on calcium sulfoaluminate containing, in addition to a suitable amount of calcium sulfoaluminate, also tricalcium silicate and dicalcium silicate (thus avoiding the need, asserted by the teachings of Kunbargi, of admixing the sulfoaluminous clinker with a separate hydraulic clinker containing tricalcium silicate and dicalcium silicate).

It is yet another feature of the invention to produce a unique clinker by using a clinkering furnace (typically a rotary cement kiln) provided with a preheater and precalciner, which clinker is composed of calcium sulfoaluminate, tricalcium silicate and dicalcium silicate with other additional components in lower proportions, as a result of a single calcination operation in an industrial kiln.

A further feature of this invention is a method of preparing a cement based on calcium sulfoaluminate with better handling characteristics and with a fast development of the strength thereof, all of which are the result of the improved unique clinker composition and, following after or simultaneously with the grinding, other further components are incorporated therein, thus obtaining a cement with very high and fast developing strength, a better control of the setting time and, in particular, the assurance that the strength to be developed always remains within the preset control parameters.

As a review of the advantages provided by the invention forming a subject matter of this application, there can be mentioned the following:

a) An improved clinker that, according to the teachings of the prior art was impossible to produce, is now produced.

b) The general chemical composition of the clinker thus produced allows the same to be conveniently activated by other components during a further grinding process;

c) It is possible to produce, in a wholly controlled and predictable manner, through the process of producing the cement of this invention, a cement which very quickly develops a very high mechanical strength.

d) A cement according to the applicants' invention exhibits characteristics that permit construction of concrete pavements which can be opened to heavyweight traffic no later than eight hours after the construction thereof; the use of which clearly can be extendable to the laying of airplane runways and the repair of concrete bridges or structures; with said uses being only mentioned as illustrative rather than restrictive examples.

For the sake of simplicity, in the disclosure of the invention forming the subject matter of this application, the following shorthand symbols, typically employed throughout the world in the cement industry, will be employed herein from time-to-time for certain compounds, as follows:

S will identify $SiO_2$
A will identify $Al_2O_3$
F will identify $Fe_2O_3$
C will identify $CaO$
M will identify $MgO$
$\bar{S}$ will identify $SO_3$
N will identify $Na_2O$
K will identify $K_2O$
H will identify $H_2O$

SUMMARY OF THE INVENTION

As previously stated herein, the invention of this application comprises obtaining a clinker as the result of the calcining of the raw materials forming the cement, the chemical composition of which had not previously been obtained industrially; the resulting composition being a high content of mainly calcium sulfoaluminate $4CaO.3Al_2O_3.SO_3$, tricalcium silicate $3CaO.SiO2$ and dicalcium silicate $2CaO.SiO_2$, with optimal amounts of calcium oxide or hydroxide (lime and hydrated lime) being added to said clinker during the grinding stage, together with optimal amounts of any of the different forms of calcium sulfate, either natural or industrially produced or as an industrial byproduct. The addition of these latter ingredients produces the activation of the clinker.

Of course, the addition of the last mentioned ingredients can be carried out prior to the grinding or during the same, thus giving to the sulfoaluminous clinker, the lime or hydrated lime and the calcium sulfate the fineness needed to use the same as a cement with the essential characteristic thereof being the development of high strength in a very short time.

As raw materials for the production of the clinker, any type of materials generally used in the production of hydraulic cements, based on calcium sulfoaluminate, can be employed, which, adequately dosified, provide the mixture with the suitable chemical composition. Said mixture, prior to the grinding thereof, will be fed into an industrial kiln of the type normally known in the cement industry, wherein it is calcined to a temperature above 1200° C., thus producing a sulfoaluminous clinker as a step in the procedure for obtaining the cement of this invention.

As examples of the raw materials that can be used, are those normally employed in the production of Portland cement, such as limestone, shales and calcium sulfate in any of the naturally occurring forms, such as gypsum or anhydrite; various clays such as kaolin and alumites and any of the different types of bauxite, when necessary.

The use of raw materials resulting as residues from industrial processes is also possible, being only limited by the need to comply with provisions relating to environmental laws. Thus, a gypsum obtained as a byproduct from an industrial process, such as phosphogypsum (marginally obtained in the industrial production of phosphoric acid), can be employed.

The amounts of raw materials used in the production of the clinker depend on the requirement that, after their calcining to temperatures above 1200° C., the following composition percentages are satisfied:

1. The calculated content of calcium sulfoaluminate is comprised preferably between 20% and 40% of the total weight of the clinker composition.

2. The calculated content of dicalcium silicate should be comprised preferably between 10% and 30%.

3. The calculated content of tricalcium silicate forcedly must be always greater than at least 1%, but preferably will be of from 10% to 30%.

4. The calculated content of anhydrite $CaSO_4$ will be at least 1%.

5. In no instance may the combined content of lime in the clinker, calculated as total lime minus free lime, give values of $C_3S$ inconsistent with those specified in item three.

6. Preferably, the content of free (i.e. uncombined) lime will be lower than 0.5%; but in no case will the free lime content be such as to result in overall clinker content values that are inconsistent with the values that are specified in items 3 and 4.

According to the teachings of this invention the coexistence of dicalcium and tricalcium silicates in the clinker produced from calcium sulfoaluminate is highly important; and therefore the temperature of the hottest zone in the kiln will be higher than 1200° C. It is also highly important that the combination reaction of calcium oxide with the other oxides be as complete as possible. This, in turn, makes it necessary that the control of the kiln operation is effected by determining the calcium oxide amount remaining uncombined (such uncombined calcium oxide being known in the cement industry as free lime). In order to make the analytical determination of the calcium oxide remaining uncombined, the most suitable method is that disclosed by ASTM-C114: Chemical Analysis of Hydraulic Cement. This determination method provides for a precise control of the kiln operation, thus ensuring that the chemical reactions carried out in the interior of the kiln are effected in the desired manner; whereby the formation of preset amounts of calcium sulfoaluminate and dicalcium and tricalcium silicates are guaranteed.

Once the clinker has been produced, it is determined in the laboratory the optimal amounts of calcium hydroxide and calcium sulfate that are to be dosified into the clinker during the grinding process in order to attain a final cement product having the desired compressive strength.

The dosing of calcium hydroxide and calcium sulfate to the clinker could be advantageously effected, as already mentioned, prior to and/or during the grinding of said materials to the preset fineness. Any of the several existing forms of calcium sulfate can be used provided only that the temperature within the grinding mill is such that the cement during the grinding process reaches a temperature of from about 100 to 125° C. and that the holding time in the mill is enough to convert gypsum ($CaSO_4.2H_2O$) to the hemihydrate ($CaSO_4.\frac{1}{2}H_2O$); thus ensuring that the calcium sulfate present in the cement is ready to react quickly during the hydration of the cement; and that the latter develops the desired strength.

The presence of calcium hydroxide, added prior to or during the cement grinding, as well as the fact that calcium sulfate is present in the cement composition as the hemihydrate, are wholly unknown teachings (taking into account the disclosed and claimed subject matter of the Kunbargi patent). The teaching of the present invention is the basis for the fact that the application's calcium sulfoaluminate-based cement consistently develops the desired fast strength and that the set time is retarded, thus making easier the use of the concrete.

DETAILED DESCRIPTION OF THE INVENTION

As already established above, the invention forming the subject matter of this application is particularly related to the controlled industrial production of a cement based on calcium sulfoaluminate, capable of developing in a predictable matter, very high strengths in short periods of time (yet with a setting time that is more retarded than in prior $C_4A_3\bar{S}$-based cements).

It is to be pointed out that the cements of the prior art, based on calcium sulfoaluminate, were exclusively classified by taking into account the function of their expansive characteristics; while, on the contrary, in this invention said expansion characteristic is not relevant.

It is also to be pointed out that when reference is made in this disclosure to a solution, it will be meant the paste resulting from the water addition to the cement, wherein certain substances are dissolved as a result of the cement hydration reactions.

Basically, the fast development of strength in cements of this invention is particularly based on a chemical compound formed in the concrete, the so-called ettringite, the formula of which is $3CaO.Al_2O_3.3CaSO_3.32H_2O$ [or $C_3A(C\bar{S})_3H_{32}$], the formation conditions of which will be precisely detailed in the disclosure of the invention hereinbelow set forth], which is the result of the chemical reactions involving the calcium sulfoaluminate, calcium sulfate and calcium hydroxide, when the cement is hydrated.

It is of particular importance, according to the teachings of this invention, that said ettringite is produced from the first moments of the hydration of the cement. It is essential therefore that the solution contains the necessary amounts of the calcium ions $Ca^{2+}$, sulfate ions $SO_4^{2-}$ and hydroxyl ions $OH^-$. Such amounts must be sufficient to form a supersaturation of the respective ions in the solution forming the cement paste; with the calcium and sulfate ions reacting with the calcium sulfoaluminate to form ettringite, while the hydroxyl ions will maintain a pH above 12, thus favoring the ettringite formation.

From the foregoing brief description, some limitations are derived for clinker composition, according to the present invention; summarized as follows:

1. Essentially all of the aluminum oxide present in the clinker must be present as sulfoaluminate, in order to guarantee the maximum formation of ettringite in the minimum possible period of time; starting with a single aluminum compound (i.e. the sulfoaluminate) during the hydration of cement through the development of a single chemical reaction therewith. Should tricalcium aluminate exist in the clinker (or in the final cement), ettringite could be formed derived from a reaction of tricalcium aluminate with the calcium sulfonate; but both the reaction rate and the chemical equilibrium would adversely change due to the presence of two compounds simultaneously competing for sulfate ions, at different rates.

2. In order to be sure that all of the aluminum oxide present is in the sulfoaluminate form in the clinker, a slight excess of $SO_3$ must be provided; i.e., a minimum of anhydrite ($CaSO_4$) must be present in the clinker (such that all of the aluminum oxide that can react combines with $SO_3$ to form sulfoaluminate). If there is an excess of aluminum oxide, due to a lack of sulfate ion, tricalcium aluminate will be formed, and it is undesirable to have the latter compound present in the cement, as already explained in the preceding paragraph.

3. In order to be sure that the ettringite formation occurs quickly, it is necessary that a highly alkaline medium is maintained; i.e., a pH at least equal to or greater than 12, which preferably is provided by the presence of the $OH^-$ ions from the hydrated lime addition to the cement (during or prior to the grinding). Additionally, the $Ca^{2-}$ ions also present from the hydrated lime addition contribute to the maintenance of the supersaturation of the calcium ions, needed for the quick formation of ettringite.

The presence of free lime in the clinker affects the amount of calcium ions present in the cement hydration solution and also contributes to maintaining a high pH value therein; but the rate at which it enters into solution depends on several factors. For instance, the high calcining temperature reached by the clinker in the kiln when practicing the present invention produces a less reactive lime (dead-burned lime) than a conventionally-produced well-burned lime. The free lime grains in the clinker are of different sizes and generally become surrounded by the remaining chemical compounds, when formed as part of the clinker, whereby the availability for the reaction is not immediate. In fact, the speed and the time when the reaction of the residual free lime in the clinker starts, are not known exactly. This is the reason why it is provided that the free lime, calcium oxide, in the clinker must be maintained at a minimum level, i.e., at a value of less than 0.5% (even though conventional lime is added to the clinker in the final cement formulation). Furthermore, the maximum possible formation of dicalcium and tricalcium silicates is thus secured.

4. If, after the clinker calcination, the value for the free lime is greater than 0.5%, this factor can be determined during the clinker activation tests and must be corrected so as to avoid an excess of free lime during continued clinker production, for the reasons provided in the previous paragraph, and also because an excess of free lime could cause the additional following problems:

a) An undesirable and uncontrolled expansion could exist during the hydration of cement, as a result of the hydration and extemporaneous reaction of the free lime. Should this happen, the formation of ettringite would be retarded, thus causing the destructive expansion of the cement.

b) The calculation for the compounds could reach a negative value for tricalcium silicate, thus altering the chemical equilibrium conditions needed to obtain the specific chemical composition of this invention; and cement thus produced will tend to fall within the specification and behavior problems of Kunbargi's cements; therefore, and in view of the above-discussed problems, the free lime must be maintained below a value at which a negative tricalcium silicate value would otherwise be obtained.

Further to the above described characteristics, regarding the chemical composition of the clinker, it is very important that the kiln operation conditions are suitable to obtain the formation of the desired compounds within the determined parameter values. Within the kiln operation parameters, the temperature reached by the material in the hottest zone will be of more than 1200° C. and, preferably, within the range of from 1200 to 1500° C.

An additional operational characteristic of the kiln is that it must be operated in such a manner that the material remains at the maximum temperature for a time sufficient to adjust the content of resulting free lime in the clinker to lower than 0.5%. The chemical composition of the thus produced clinker will be evaluated by any of the methods of chemical analysis used in the cement industry, for instance, by means of X-ray florescence. However, in case of discrepancy in the results, the method to be used should be the one disclosed in ASTM-C-114: Chemical Analysis of Hydraulic Cement. In order to determine the free lime content during the kiln operation, the recommended and more suitable analytical method is that disclosed in ASTM-C-114: Chemical Analysis of Hydraulic Cement-94, paragraph 27.

The following are the calculations used for controlling the kiln operation and the clinker compound composition:

1. The chemical analysis expressed as mass percentages, will be expressed in moles (for which the percentage of every oxide will be divided by its molecular weight):

| | |
|---|---|
| Moles of silicon oxide | $SiO_2$ = $\%SiO_2/60.07$ |
| Moles of aluminum oxide | $Al_2O_3$ = $\%Al_2O_3/101.96$ |
| Moles of ferric oxide | $Fe_2O_3$ = $\%Fe_2O_3/159.69$ |
| Moles of total calcium oxide | $CaO(t)$ = $\%CaO(t)/56.08$ |
| Moles of free calcium oxide | $CaO(x)$ = $\%CaO(x)/56.08$ |
| Moles of sulfuric anhydride | $SO_3$ = $\%SO_3/80.06$ |

2. It will be deduced from the content of total moles of calcium oxide $CaO(t)$ and the content of free calcium oxide $CaO(x)$; a value which will be considered as the combined calcium oxide $CaO(c)$.

3. It will be considered that all of the aluminum oxide content $Al_2O_3$ is combined as calcium sulfoaluminate $4CaO.3Al_2O_3.SO_3$.

4. Moles of $SO_3$ and CaO are calculated as forming calcium sulfoaluminate $4CaO.3Al_2O_3.SO_3$:

Moles $SO_3$ combined in sulfoaluminate, $SO_3$=moles $Al_2O_3/3$.

Moles CaO combined in sulfoaluminate, $CaO(1)$=moles $Al_2O_3 \times (4/3)$.

5. The content of calcium sulfoaluminate in moles in the clinker will be equal to the number of moles of $SO_3$ in the calcium sulfoaluminate.

6. The content of anhydrite ($CaSO_4$) in the clinker will be equal to the excess moles of $SO_3$: Moles anhydrite ($CaSO_4$)=total moles of $SO_3$—$SO_3$ in calcium sulfoaluminate. CaO in anhydrite=$CaO(2)$=moles $SO_3$ in anhydrite.

7. All of the $Fe_2O_3$ will be considered as $2CaO.Fe_2O_3$.

8. Calculate the amount of CaO necessary to form $2CaO.Fe_2O_3$:

moles CaO in $2CaO.Fe_2O_3.CaO(3)$=moles $Fe_2O_3 \times 2$.

9. Calculate remaining moles calcium oxide uncombined in that moment:

Moles CaO uncombined $[CaO(4)]=CaO(c)-CaO(1)-CaO(2)-CaO(3)$.

10. Calculate the molar ratio: $CaO(4)/SiO_2$. If said ratio is lower than 2, clinker will be out of specification. The calculation ends.

11. Calcium oxide encountered as C2S will be: $CaO(5)$= moles $SiO_2 \times 2$.

12. Content of C3 S in moles will be $CaO(4)$ less CaO in C2S: moles C3S=$CaO(4)-CaO(5)$.

13. Content of C2S equals the total content of moles $SiO_2$ minus C3S moles.

14. Finally, in order to transform the results of the calculation of compounds into mass percentages, the value obtained for every compound will be multiplied by the molecular weight thereof:

the percentage of calcium sulfoaluminate $4CaO.3Al_2O_3.SO_3$=moles $4CaO.3Al_2O_3.SO_3 \times 610.26$;

the percentage of anhydrite ($CaSO_4$)=moles $CaSO_4 \times 136.14$;

the percentage of calcium ferrite ($2CaO.Fe_2O_3$)=moles $2CaO.Fe_2O_3 \times 271.85$;

the percentage of tricalcium silicate (C3S)=moles C3S$\times 228.3$; and the percentage of dicalcium silicate (C2S)=moles C2S$\times 172.23$.

Coexistence of both calcium sulfoaluminate and dicalcium and tricalcium silicates in clinker at the outlet of an industrial kiln can be verified by means of different analytical methods, for instance, by optical microscopy or by scanning electronic microscopy. Also the coexistence of the abovementioned compounds can be verified by X-ray diffraction; however, although any of the methods could be used as a complementary control, it is not needed that the same be used as the main process control, which should be based on the free lime control by means of the just-described analytical method.

It is recommended that the chemical composition of clinker be controlled during the raw materials grinding, by carefully controlling the raw meal composition, during which stage of the process also the dosification of the different materials is carried out (such as limestones, shales, clays, kaolins, bauxites, gypsum, etc.). This is the normal manner of controlling the clinker composition in the cement industry.

It is obvious that different materials can be used without problem in the production of clinker, resulting as residues or industrial byproducts of other industries, such as, for instance, sand from casting molds, phosphogypsum, etc. Also, the method of grinding the raw materials can be effected through any process normally used in the cement industry; e.g., by using ball mills, vertical mills, roller presses and some combinations of such equipment.

The furnace used for producing said clinker can be any type of kiln normally used in the production of clinker for Portland cement, such as, for instance, rotary kilns, kilns with a preheater using any of the different types of cyclones or grates, kilns with preheater and precalciner, etc., can be used without restrictions (provided the process conditions and/or composition limitations set forth elsewhere herein are followed). Likewise, any type of the existing systems to cool clinkers could be used in the discharge of the kiln, being those common in the cement industry; among which there can be mentioned as coolers: grate coolers and planetary coolers.

Once the clinker is produced, the same is to be evaluated and assayed in the laboratory by means of activation tests by addition of calcium oxide or hydroxide and some form of calcium sulfate. The clinker industrially produced will not necessarily result, when ground to any fineness, in a cement capable of fast development of high strength, and generally this is not the case.

The fast development of high strength will derive from the improved suitable chemical composition of clinker; but also from the adjustment thereof to give a suitable chemical composition of cement, providing for a fast formation of ettringite crystals, the formation of which will be through the reaction of calcium sulfoaluminate with the added calcium hydroxide and calcium sulfate.

Contrary to what was pointed out by Collepardi and Turrizani in 1972, said reaction will depend on the concentration in the solution of $SO_3^{2-}$ and $OH^-$ ions. The time of formation of the ettringite crystals and, therefore, the development of high early strength will depend on the almost immediate availability of such ions in the solution; due to which it is important to have adequate dosing of $Ca(OH)_2$ without depending on the presence of said compound as a function of the free lime or the generation of $Ca(OH)_2$ from C3S hydration, as proposed by Kunbargi in his Patent 4,957,556 (the reaction rate of which is practically impossible to calculate or predict).

Something similar occurs with the presence of $SO_3^{2-}$ ions in the solution, the behavior of which is erroneously evaluated in laboratory tests by addition of gypsum directly to the clinker without taking into account the real behavior of these materials in the industrial practice; since it is a common practice that the presence of $SO_3^{2-}$ is calculated in the laboratory as proceeding from gypsum and not from its hemihydrate.

During industrial grinding, the temperature of the materials in the grinding circuit must increase to temperatures of from 100 to 130° C. Under such temperature conditions, gypsum ($CaSO_4.2H_2O$) loses one and a half molecules of water and becomes a hemihydrate, $CaSO_4.\frac{1}{2}H_2O$, the dissolution speed and $SO_3$ saturation equilibrium of which are different for gypsum relative to its anhydrite. This failure to recognize the foregoing being a reason for an unsuitable dosing by the prior art of the amount of $SO_3$, it being merely indicated to be necessary to add gypsum to the clinker, in order to optimize the development of the strength thereof, due to which, according to the prior art, unpredictable results were obtained.

The laboratory activation tests, prior to the grinding, are thus effected on (1) a clinker sample representative of the lot to be ground, with (2) a sample of gypsum representative of the lot to be used and that has been maintained at least during 24 hours in a laboratory furnace at 120° C., proving the transformation thereof into the hemihydrate $CaSO_4.\frac{1}{2}H_2O$ by means of differential thermal analyses, thermogravimetry and X-ray diffraction, and with (3) a representative sample of the hydrated lime lot to be employed in the grinding. The above listed materials will be previously ground to a fineness similar to that expected to be produced in the cement, and the fineness will be expressed as the percentage of cement particles smaller than 45 $\mu$m.

Once said materials are wholly identified, the optimal content of hydrated lime and hemihydrate will be determined, to be dosified in the clinker for the activation thereof. Mixtures of clinker and hemihydrate, with various contents of $SO_3$ from the latter, for instance, 3%, 5%, 7% $SO_3$ added, are prepared and then for each mixture, increasing amounts of hydrated lime are dosified, starting, for instance, from 1% and with 1% increments, since in this case, the variation in the lime content is critical. Then, a series of samples will be obtained, identified as follows:

1. +3% $SO_3$ and 1, 2, 3, 4, 5 or 6% hydrated lime;
2. +5% $SO_3$ and 1, 2, 3, 4, 5 or 6% hydrated lime, etc.

For each of the samples, the compressive strength will be determined by means of the method ASTM-C109- Standard Test Method for Compressive Strength of Hydraulic Cement Mortars, taking only into account that the water:cement ratio will be adjusted through the use of the flow table and not through a water:cement constant ratio, as specified for Portland cements. Developed strengths can be verified for aging at convenient time intervals (for instance, one and a half hours, three hours, etc.) following the addition of water to the dry cement-sand mixture and, by means of this method, they can be easily related to the strengths developed over the same time intervals by a standard hydraulic cement (for instance, a Portland cement) used as a reference.

As an example of the compressive strengths that can be obtained according to the teachings of this invention, the following table is offered wherein the strengths of Portland cement are also shown.

TABLE 1

| Age | High-strength cement MPa Compressive Strength | Portland cement Type I MPa Compressive Strength |
|---|---|---|
| 1.5 hs. | 5.0 | Note 1 |
| 3.0 hs. | 7.5 | Note 1 |

TABLE 1-continued

| Age | High-strength cement MPa Compressive Strength | Portland cement Type I MPa Compressive Strength |
|---|---|---|
| 5.0 hs. | 10.0 | Note 2 |
| 24.0 hs. | 20.0 | 10.0 |

Note 1: The concrete cubes do not maintain their shape when demolded; whereby they cannot even be subjected to the compression test.
Note 2: Although the cubes maintain their shape when demolded, the same are crushed as soon as pressure is applied. Thus, no resistance can even be measured.

All of the results of the compressive strength in the above table are expressed in MPa (Megapascals) and have been obtained by ASTM-C-109 method: Standard Test Method for Compressive Strength of Hydraulic Cement Mortars.

As with other cements based on sulfoaluminate, it is possible to delay the setting of the cement of this invention by means of the use of organic products, such as citric acid, as disclosed in the above recited article by Collepardi and Turriziani.

Based on the studies carried out by the inventors, on the cement hydration reactions, it has been concluded that the fast development of strength with the cement of this invention is due to the formation of ettringite crystals, which are present from the very moment when the water addition is started. It is believed that only said compound contributes to the fast development of the cement strength, as the dicalcium and tricalcium silicates act at the beginning only as stabilizers for the main reaction, due to their slow contribution of calcium ions $Ca^{2+}$ to the solution; thus helping in a high pH value stabilization, which, as above stated, is important for the development of the main reaction. Said dicalcium and tricalcium silicates later contribute in a slower and gradual manner, to the further development of the mechanical strength, all due to their slower hydration reaction.

It is herein agreed regarding the mechanism established by Collepardi and Turriziani, that the main reaction is:

$$C_4A_3\bar{S} + 6\ Ca(OH)_2 + 8\ (CaSO_4 \cdot 2H_2O) + 74\ H_2O = 3\{C_3A \cdot (C\bar{S})_3 \cdot H_{32}\}.$$

However, the authors argued that the contribution of $Ca(OH)_2$ was due to the hydration of calcium silicates, which reaction, as already discussed hereinabove, proceeds in a manner which is too slow (whereby the contribution of $Ca(OH)_2$ is needed in a more direct manner); to obtain the rapid strength development of the cements of this invention based on calcium sulfoaluminate, (never attained by said authors).

On the other hand, it is possible to track the hydration reactions of the cement of this invention, by means of techniques that are common for the study of hydration reactions in other hydraulic cements. One can consult the suitable literature for such techniques and, therefore, the inclusion thereof in this disclosure was considered unnecessary.

Some aspects of tracking the hydration reactions (by means of the X-ray diffraction technique) will be described.

The tracking of said reaction is started one minute after the reaction begins, when water and cement are brought into contact, starting with the definition in the diffraction diagrams of the lines identifying the presence of ettringite from the very first moment. With the passage of time, the lines will be more precise and will grow while, conversely, those lines corresponding to the calcium sulfoaluminate will be diminishing in their intensity.

For the purposes of this invention, the optimal composition of the invention would be such that, the ettringite lines would be present from the very first moment and increase regularly in the intensity thereof, while those lines identifying calcium sulfoaluminate would regularly diminish their intensity down to the complete disappearance thereof 24 hours after the hydration reactions start, thus showing the total information of ettringite on the basis of calcium sulfoaluminate. It is obvious that the real behavior of cement could differ slightly from that just herein disclosed; but in essence would be highly similar.

It is to be clearly noted from the above that the teachings of Kunbargi differ wholly from that above stated, since said patentee established in his patent that the fast strength developed by the cements based on sulfoaluminate was due to the calcium aluminate reaction, as it occurs with aluminous cements. In cements according to the present invention, based on calcium sulfoaluminate, there is no calcium aluminate present. Moreover, in this invention provision is made for the quantification of the cement composition in order to prevent the presence of any possible compositions of calcium aluminate (e.g. C3A, C12A7, etc.).

What is claimed is:

1. A method of producing a calcium sulfoaluminate-containing cement clinker, comprising subjecting a mixture of cement raw materials, to calcining temperatures sufficiently above 1200° C. to assure the consistent coexistent formation of dicalcium silicate and tricalcium silicate in an industrial kiln; said kiln having a preheater; said raw materials being sources of CaO, $SiO_2$, $Al_2O_3$ and $SO_3$ and being mixed so as to obtain clinker having a content of 20% to 40% of calcium sulfoaluminate, 10% to 30% of dicalcium silicate, at least 1% of tricalcium silicate, at least 1% of anhydrite so as to assure the suppression of the presence of any aluminate apart from calcium sulfoaluminate, and less than 0.5% of free calcium oxide, all percentages being based on the total weight of said clinker obtained.

2. The method of producing cement clinker according to claim 1, wherein the content of tricalcium silicate is from 10% to 30%.

3. The method of producing cement clinker according to claim 2, wherein said industrial kiln has a precalciner.

4. The method of producing cement clinker according to claim 1, wherein said industrial kiln has a precalciner.

5. The method of producing cement from clinker made according to claim 1, further comprising activating said clinker obtained by addition of an amount of about 1% to 6% of calcium oxide or hydroxide and about 3% to 7% calcium sulfate, the later percentage being in terms of $SO_3$ present, and subjecting the resulting mixture to grinding, having a significant percentage of particles smaller than 45 μm and maintaining a grinding temperature sufficient to effectively achieve the hemihydrate phase of calcium sulfate.

6. The method of producing cement according to claim 5, wherein the grinding temperature is maintained between 100° and 130° C.

7. The method of producing cement clinker according to claim 1, wherein the calcining temperature is between 1200° and 1500° C.

8. The method of producing cement according to claim 5, wherein said clinker activation through the addition of calcium oxide or hydroxide is carried out prior or during the grinding step of said mixture.

9. A calcium sulfoaluminate-containing cement, produced by the method of claim 5.

10. The calcium sulfoaluminate-containing cement, produced by the method of claim 5, wherein said cement upon hydration has a pH higher than 12 and develops a compressive strength of about 10 mpa within a period of about 5 hours due to the formation of ettringite when said calcium sulfoaluminate reacts with calcium and sulfate ions.

11. The method of producing cement clinker according to claim 1, wherein the mixture of cement raw materials is selected from the group consisting of limestone, shales, calcium sulfate and clays.

* * * * *